(12) United States Patent (10) Patent No.: US 12,134,710 B2
Kim et al. (45) Date of Patent: Nov. 5, 2024

(54) ECO-FRIENDLY ADHESIVE COMPOSITION FOR RUBBER REINFORCING MATERIAL, AND METHOD FOR MANUFACTURING RUBBER REINFORCING MATERIAL USING SAME

(71) Applicant: KOLON INDUSTRIES, INC., Seoul (KR)

(72) Inventors: Da Ae Kim, Seoul (KR); Min Ho Lee, Seoul (KR); Ok Hwa Jeon, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 1426 days.

(21) Appl. No.: 16/491,273

(22) PCT Filed: Mar. 21, 2018

(86) PCT No.: PCT/KR2018/003284
§ 371 (c)(1),
(2) Date: Sep. 5, 2019

(87) PCT Pub. No.: WO2018/182229
PCT Pub. Date: Oct. 4, 2018

(65) Prior Publication Data
US 2020/0010741 A1 Jan. 9, 2020

(30) Foreign Application Priority Data
Mar. 30, 2017 (KR) .................. 10-2017-0041084

(51) Int. Cl.
*C09J 109/08* (2006.01)
*B05D 1/18* (2006.01)
(Continued)

(52) U.S. Cl.
CPC .............. *C09J 109/08* (2013.01); *B05D 1/18* (2013.01); *B05D 7/02* (2013.01); *B05D 7/24* (2013.01); *C09J 107/02* (2013.01); *C09J 111/02* (2013.01)

(58) Field of Classification Search
None
See application file for complete search history.

(56) References Cited

U.S. PATENT DOCUMENTS

2002/0144779 A1 10/2002 Pelton
2003/0166743 A1 9/2003 Huynh-Tran et al.
(Continued)

FOREIGN PATENT DOCUMENTS

CN 101454417 A 6/2009
CN 102414362 A 4/2012
(Continued)

OTHER PUBLICATIONS

China Adhesives, vol. 24, No. 4, Apr. 2015, pp. 27-31 "Study on properties of aromatic polyester polyurethane dispersion adhesive".
(Continued)

*Primary Examiner* — Randy P Gulakowski
*Assistant Examiner* — Ha S Nguyen
(74) *Attorney, Agent, or Firm* — Harvest IP Law, LLP (57) ABSTRACT

One embodiment of the present invention provides an adhesive composition including, on the basis of the total weight thereof, 0.5 to 4.0% by weight of an epoxy compound, 1.0 to 8.0% by weight of an isocyanate compound, 1.7 to 22% by weight of a rubber latex, 1.0 to 8.0% by weight of a polyurethane dispersion (PUD) resin, 0.1 to 2.0% by weight of an amine compound, and 69 to 92% by weight of a solvent, wherein the epoxy compound and the isocyanate compound have a weight ratio of 1:1 to 1:10.

24 Claims, 1 Drawing Sheet

(51) Int. Cl.
- *B05D 7/02* (2006.01)
- *B05D 7/24* (2006.01)
- *B60C 9/00* (2006.01)
- *C09J 107/02* (2006.01)
- *C09J 111/02* (2006.01)
- *C09J 163/00* (2006.01)
- *C09J 175/04* (2006.01)

(56) References Cited

U.S. PATENT DOCUMENTS

| | | | |
|---|---|---|---|
| 2005/0147817 A1 | 7/2005 | Pelton | |
| 2012/0041113 A1* | 2/2012 | Ikeda | C08L 9/08 524/114 |
| 2017/0130396 A1 | 5/2017 | Cevahir et al. | |

FOREIGN PATENT DOCUMENTS

| | | | |
|---|---|---|---|
| CN | 106084362 A | * | 11/2016 |
| JP | 2003221787 A | * | 8/2003 |
| JP | 2011251582 A | | 12/2011 |
| JP | 2012224962 A | | 11/2012 |
| KR | 10-2004-0073571 A | | 8/2004 |
| KR | 10-2004-0106286 A | | 12/2004 |
| KR | 10-2006-0016538 A | | 2/2006 |
| KR | 10-2007-0069541 A | | 7/2007 |
| KR | 10-2012-0023706 A | | 3/2012 |
| KR | 10-2015-0113745 A | | 10/2015 |
| KR | 10-2017-0013892 A | | 2/2017 |
| WO | 2010-125992 A1 | | 11/2012 |
| WO | 2015-188939 A1 | | 12/2015 |

OTHER PUBLICATIONS

Supplementary European Search Report issued by the European Patent Office (EPO) on Aug. 4, 2020.
Database WPI, Week 200716, Thomson Scientific (family patent KR10-2006-0016538A).
Database WPI, Week 200825, Thomson Scientific (family patent KR10-2007-0069541A).
Database WPI, Week 201716, Thomson Scientific (family patent CN106084362A).
International Search Report for PCT/KR2018/003284 dated Jun. 28, 2018 [PCT/ISA/210].

* cited by examiner

ECO-FRIENDLY ADHESIVE COMPOSITION FOR RUBBER REINFORCING MATERIAL, AND METHOD FOR MANUFACTURING RUBBER REINFORCING MATERIAL USING SAME

CROSS REFERENCE TO RELATED APPLICATIONS

This application is a National Stage of International Application No. PCT/KR2018/003284 filed Mar. 21, 2018, claiming priority based on Korean Patent Application No. 10-2017-0041084 filed Mar. 30, 2017.

TECHNICAL FIELD

The present invention relates to an eco-friendly adhesive composition for a rubber reinforcing material, and a method for manufacturing a rubber reinforcing material using the same, and more particularly to an adhesive composition which has excellent adhesive strength even without containing resorcinol and formaldehyde, and a method for manufacturing a rubber reinforcing material using the same.

BACKGROUND ART

As a fiber type of reinforcing material (referred to as "fiber reinforcing material") applied to rubber structures such as tires, belts, hoses, and the like, synthetic fibers such as polyester fibers represented by polyethylene terephthalate (PET), polyamide fibers represented by nylon, aromatic polyamide fibers, and polyvinyl alcohol fibers are used.

Among these synthetic fibers, since the polyester fiber and the aromatic polyamide fiber have poor adhesion to rubber, methods of improving the adhesion of the synthetic fiber to rubber by coating the surface of the synthetic fiber with an adhesive have been proposed.

For example, in order to improve the adhesive strength between the polyester fiber for a tire cord (also referred to as a "raw cord") and the rubber for a tire, an adhesive is applied to the polyester fiber. The application of such an adhesive includes, for example, a step of dipping the polyester fiber into an adhesive composition, wherein the dipping step can be performed more than two times. At this time, an adhesive layer or a coating layer is formed on the polyester fiber mainly in a second dip.

Conventionally, a latex (Resorcinol-Formaldehyde Latex, RFL) containing resorcinol-formaldehyde (hereinafter referred to as "RF") was mainly used in the second-dip. However, recently, the use of resorcinol-formaldehyde (RF) has been limited due to environmental pollution problems. In particular, the use of resorcinol-formaldehyde (RF) is regulated in the European region centering on France. When phenols, resorcinol, and formaldehyde known as a carcinogen are used, workers are repeatedly exposed to harmful substances, resulting in poor working conditions, and special management and cost for the treatment of waste liquids containing resorcinol-formaldehyde (RF) is needed and production costs increase.

Therefore, in order to solve problems such as the work environment and environmental pollution, there is a need to develop a new adhesive composition that does not contain resorcinol-formaldehyde (RF).

In addition, since polyester (PET) fibers which are currently widely used for the production of reinforcing materials for reinforcing a rubber (hereinafter referred to as "rubber reinforcing material") have low affinity with resins consisting of resorcinol-formaldehyde (RF), sufficient adhesion with rubber cannot be achieved by an adhesive composed of resorcinol-formaldehyde latex (RFL). Therefore, there is a need to develop a new adhesive composition that can improve adhesive strength between polyester (PET) fibers and rubber.

DETAILED DESCRIPTION OF THE INVENTION

Technical Problem

The present invention is intended to provide an adhesive composition capable of overcoming the limitations and problems of the related art as described above, a rubber reinforcing material using the same, and a method for manufacturing the same.

An aspect of the present invention is to provide an adhesive composition which has excellent adhesive strength without containing resorcinol and formaldehyde (RF).

Another aspect of the present invention is to provide a method for manufacturing a rubber reinforcing material using the aforementioned adhesive composition which does not contain resorcinol-formaldehyde (RF).

Still another aspect of the present invention is to provide a rubber reinforcing material using the adhesive composition which does not contain resorcinol-formaldehyde (RF). A further aspect of the present disclosure is to provide a method of manufacturing a tire cord, and a tire cord using an adhesive composition not containing resorcinol-formaldehyde (RF).

In addition to the aspects of the invention described above, other features and advantages of the present invention will be set forth in part in the description which follows, or will become apparent to those having ordinary skill in the art from such a description.

Technical Solution

In accordance with one aspect of the present invention, an adhesive composition including an epoxy compound, an isocyanate compound, a rubber latex, a polyurethane dispersion (PUD) resin, an amine compound, and a solvent, wherein the epoxy compound and the isocyanate compound have a weight ratio of 1:1 to 1:10, is provided.

The adhesive composition includes, on the basis of the total weight thereof, 0.5 to 4.0% by weight of the epoxy compound, 1.0 to 8.0% by weight of the isocyanate compound, 1.7 to 22% by weight of the rubber latex, 1.0 to 8.0% by weight of the polyurethane dispersion (PUD) resin, 0.1 to 2.0% by weight of the amine compound, and 69 to 92% by weight of the solvent.

The mixture of the epoxy compound and the isocyanate compound, and the rubber latex, may have a weight ratio of 1:3 to 1:18.

The epoxy compound and the isocyanate compound have a weight ratio of 1:1 to 1:8.

The solvent includes water ($H_2O$).

The water is included in a content of 69 to 80% by weight based on the total weight.

The epoxy compound includes at least one of a glycidyl ether type of compound, a novolac type of epoxy resin, and a bisphenol type of epoxy resin.

The isocyanate compound has a phenyl group.

The rubber latex includes at least one of a vinylpyridine-styrene-butadiene copolymer latex, a modified latex in which a vinylpyridine-styrene-butadiene copolymer is modified with a carboxyl group, a styrene-butadiene latex, and a modified latex thereof, natural rubber latex, an acrylic acid ester copolymer-based latex, a butyl rubber latex, and a chloroprene rubber latex.

The polyurethane dispersion resin includes at least one of a polycarbonate-based urethane, a polyester-based urethane, a polyacrylic urethane, a polytetramethylene-based urethane, a polycaprolactone-based urethane, a polypropylene-based urethane, and a polyethylene-based urethane.

The amine compound includes at least one of an aliphatic amine, an alicyclic amine, and an aromatic amine.

Another embodiment of the present invention provides a method for manufacturing a rubber reinforcing material, including: a first coating step of a base substrate in which a base substrate for a rubber reinforcing material is dipped in a first coating liquid and dried to form a first coating layer on the base substrate; and a second coating step of a base substrate in which the first coated base substrate is dipped in a second coating liquid and dried to form a second coating layer on the first coating layer, wherein the first coating liquid includes an epoxy compound and an isocyanate compound, the second coating liquid includes an epoxy compound, an isocyanate compound, a rubber latex, a polyurethane dispersion (PUD) resin, an amine compound, and a solvent, in the first coating liquid, the epoxy compound and the isocyanate compound are mixed in a weight ratio of 2:1 to 1:2, and in the second coating liquid, the epoxy compound and the isocyanate compound are mixed at a weight ratio of 1:1 to 1:10.

The second coating liquid includes 0.5 to 4.0% by weight of the epoxy compound, 1.0 to 8.0% by weight of the isocyanate compound, 1.7 to 22% by weight of the rubber latex, 1.0 to 8.0% by weight of the polyurethane dispersion (PUD) resin, 0.1 to 2.0% by weight of the amine compound, and 69 to 92% by weight of the solvent, based on the total weight of the second coating liquid.

The base substrate includes a polyester.

The base substrate is any one of a raw cord, a film, or a fiber.

In the first coating step of the base substrate, the drying is performed at a temperature of 100 to 160° C. for 30 to 150 seconds.

The method for manufacturing a rubber reinforcing material further includes curing the first coating layer at a temperature of 200 to 260° C. for 30 to 150 seconds after the drying.

In the second coating step of the base substrate, the drying is performed at a temperature of 100 to 160° C. for 30 to 150 seconds.

The method for manufacturing a rubber reinforcing material further includes curing the second coating layer at a temperature of 200 to 260° C. for 30 to 150 seconds after the drying.

The mixture of the epoxy compound and the isocyanate compound, and the rubber latex, have a weight ratio of 1:3 to 1:18.

Another embodiment of the present invention provides a rubber reinforcing material including a base substrate for a rubber reinforcing material, a first coating layer disposed on the base substrate, and a second coating layer disposed on the first coating layer, wherein the first coating layer includes an epoxy compound and an isocyanate compound, and the second coating layer includes an epoxy compound, an isocyanate compound, a rubber latex, a polyurethane, and an amine compound.

The base substrate is a raw cord.

The rubber reinforcing material has an initial adhesive strength of 18.8 kgf or more to the rubber. Here, the initial adhesive strength is an adhesive strength between the rubber reinforcing material and the rubber before heat treatment, and is measured by a cord pull test (H-Test) method according to ASTM D4776.

The rubber reinforcing material has a heat-resistant adhesive strength of 1.2 kgf or more to the rubber. Here, the heat-resistant adhesive strength is a peel strength when a test piece is peeled at a speed of 125 mm/min using a universal material tester after treating the rubber reinforcing material with a rubber and then heat-treating the produced test piece at 160° C. for 90 minutes.

The rubber reinforcing material has a rubber adhesion ratio of 80% or more.

The foregoing general description of the present invention is intended to illustrate or explain the invention, and is not intended to limit the scope of the present invention.

Advantageous Effects

The adhesive composition according to an embodiment of the present invention does not contain resorcinol-formaldehyde (RF), and thus has excellent adhesive strength while being environmentally friendly.

The adhesive composition according to one embodiment of the present invention has excellent initial adhesive strength and heat resistant adhesive strength, and thus can improve the adhesive strength between the rubber reinforcing material and the rubber. In addition, the rubber reinforcing material manufactured using the adhesive composition according to one embodiment of the present invention has excellent affinity with the rubber and improves the durability of the rubber.

A tire cord having an adhesive layer or a coating layer made of an adhesive composition according to an embodiment of the present invention has excellent affinity with the rubber and improves the durability of the tire.

BRIEF DESCRIPTION OF THE DRAWINGS

The accompanying drawings, which are incorporated herein and form part of the specification, illustrate embodiments of the present invention, and together with the description, further serve to explain the principles of the invention.

DETAILED DESCRIPTION OF THE EMBODIMENTS

Hereinafter, embodiments of the present invention will be described in more detail with reference to the accompanying drawings.

It will be apparent to those skilled in the art that various modifications and variations can be made to the invention without departing from the technical spirit and scope of the invention. Therefore, the present invention covers both changes and modifications that fall within the scope of the invention as defined in the appended claims and equivalents thereof.

One embodiment of the present invention provides an adhesive composition. The adhesive composition according to one embodiment of the present invention can be applied to a fiber or a film for a rubber reinforcing material. In particular, it can be usefully applied to polyester fibers which are base substrates for rubber reinforcing materials. Further, the adhesive composition according to one embodiment can be applied to the manufacture of a tire cord.

The adhesive composition according to one embodiment of the invention includes an epoxy compound, an isocyanate compound, a rubber latex, a polyurethane dispersion (PUD) resin, an amine compound, and a solvent, The adhesive composition according to one embodiment of the invention does not contain resorcinol-formaldehyde (RF). The adhesive composition according to one embodiment of the present invention does not induce environmental pollution, and improves the working environment.

The adhesive composition according to one embodiment of the present invention contains 0.5 to 4.0% by weight of an epoxy compound based on the total weight.

The epoxy compound has a reactive group and thus improves the reactivity and adhesion property of the adhesive composition. In addition, the epoxy compound forms a three-dimensional network structure in the adhesive layer (or coating layer) formed by the adhesive composition together with the isocyanate compound, thereby improving the adhesive strength and stability of the adhesive layer (or coating layer).

When the content of the epoxy compound is less than 0.5% by weight based on the total weight of the adhesive composition, the reactivity and the degree of crosslinking of the adhesive composition may be reduced. Meanwhile, when the content of the epoxy compound exceeds 4.0% by weight, due to excessive reactivity, the curing degree of the adhesive composition can be increased and the adhesive strength of the adhesive layer (or coating layer) made by the adhesive composition can be reduced.

The type of epoxy compound is not particularly limited. As the epoxy compound, for example, at least one of a glycidyl ether type of compound, a novolac type of epoxy resin, and a bisphenol type of epoxy resin can be used.

Examples of the glycidyl ether-based compound include diethylene glycol-diglycidyl ether, polyethylene glycol-diglycidyl ether, polypropylene glycol-diglycidyl ether, neopentyl glycol-diglycidyl ether, 1,6-hexanediol diglycidyl ether, glycerol-polyglycidyl ether, trimethylolpropane-polyglycidyl ether, polyglycerol-polyglycidyl ether, pentaerythritol-polyglycidyl ether, diglycerol-polyglycidyl ether, sorbitol-polyglycidyl ether, and the like.

Examples of the novolac type of epoxy resin include a phenol novolac type of epoxy resin, a cresol novolac type of epoxy resin, and the like.

Examples of the bisphenol type epoxy resin include a bisphenol A type of epoxy resin, a bisphenol F type of epoxy resin, and the like.

More specifically, EX614B from NAGASE Chemical, KETL6000 from Kolon, CL16 from Ipox Chemical, GE500 from Raschig, and the like may be used as the epoxy compound.

The adhesive composition according to an embodiment of the present invention includes 1.0 to 8.0% by weight of an isocyanate compound based on the total weight.

The isocyanate compound acts as a crosslinking agent. Due to crosslinking by isocyanate, the adhesive strength of the adhesive composition is improved, and the adhesive strength and stability of the adhesive layer (or coating layer) formed by the adhesive composition are improved.

When the content of the isocyanate compound is less than 1.0% by weight based on the total weight of the adhesive composition, the amount of the isocyanate compound is relatively small, and sufficient crosslinking cannot be achieved in the adhesive layer (or coating layer) composed of the adhesive composition, and the physical properties of the adhesive layer (or coating layer) may be lowered. Thereby, the fatigue degree of the rubber reinforcing material containing these adhesive layers (or coating layers) can be increased and so the durability can be reduced.

On the other hand, when the content of the isocyanate compound exceeds 8.0% by weight, the curing degree of the adhesive layer (or coating layer) is increased by excessive crosslinking reaction with the isocyanate compound, and the fatigue degree of the rubber reinforcing material itself including such an adhesive layer (or coating layer) is increased. Thereby, the workability in the manufacturing process of the rubber composite using the rubber reinforcing material is lowered, the affinity and the adhesive strength between the rubber reinforcing material and the rubber are lowered, and the physical properties of the rubber composite may be deteriorated. The rubber composite can be made of a rubber reinforcing material and a rubber. Here, an example of a rubber reinforcing material is a "tire cord", and an example of a rubber composite is a "tire".

The isocyanate compound according to one embodiment of the present invention can have a phenyl group. Examples of such isocyanate compounds are methylene diphenyl polyisocyanate, polymethylene polyphenyl polyisocyanate, and the like.

As the isocyanate compound, a blocked isocyanate compound may also be used. The blocked isocyanate compound can be prepared, for example, by an addition reaction between the polyisocyanate compound and a known blocking agent. Examples of the blocking agent include phenols such as phenol, thiophenol, chlorophenol, cresol, resorcinol, p-sec-butylphenol, p-tert-butylphenol, p-sec-amylphenol, p-octylphenol, and p-nonylphenol; secondary or tertiary alcohols such as isopropyl alcohol and tert-butyl alcohol; aromatic secondary amines such as diphenylamine and xylidine; phthalic imide; lactams such as δ-valerolactam; caprolactams such as ε-caprolactam; active methylene compounds such as malonic acid dialkyl ester, acetylacetone, and acetoacetic acid alkylester; oximes such as acetoxime, methyl ethyl ketoxime, and cyclohexanone oxime; and basic nitrogen compounds such as 3-hydroxypyridine and acidic sodium sulfite.

More specifically, IL-6 from EMS, DM-6500 from MEISEI Chemical, etc., which are commercially available water-dispersible blocked isocyanate products, can be used as an isocyanate compound according to one embodiment of the present invention.

According to one embodiment of the present invention, the epoxy compound (A) and the isocyanate compound (B) are mixed at a weight ratio (A:B) of 1:1 to 1:10. When the weight ratio (B/A) of the isocyanate compound (B) to the epoxy compound (A) is less than 1/1, the amount of the isocyanate compound acting as a crosslinking agent is small, and thus sufficient crosslinking does not occur, the physical properties of the adhesive layer (or coating layer) formed by the adhesive composition are reduced, and the fatigue degree of the rubber composite may increase. Meanwhile, when the weight ratio (B/A) of the isocyanate compound (B) of the epoxy compound (A) exceeds 10/1, the curing degree of the adhesive layer (or coating layer) formed by the adhesive composition is increased due to excessive isocyanate compound, the fatigue resistance of the rubber reinforcing material itself is decreased and the workability is reduced in the manufacturing process of the rubber composite, and the physical properties of the rubber composite may be deteriorated.

More specifically, the epoxy compound and the isocyanate compound may be mixed and used in a weight ratio of 1:1 to 1:8. Alternatively, the epoxy compound and the isocyanate compound may have a weight ratio of 1:1 to 1:4.

The adhesive composition according to an embodiment of the present invention includes 1.7 to 22% by weight of rubber latex based on the total weight.

The rubber latex is an adhesive component and imparts adhesive strength to the adhesive layer (or coating layer) formed by the adhesive composition according to an embodiment of the present invention. In particular, the rubber latex improves the affinity and adhesive strength between the adhesive layer (or coating layer) formed by the adhesive composition and the rubber, and improves adhesive strength between the rubber reinforcing material and the rubber.

When the content of the rubber latex is less than 1.7% by weight based on the total weight of the adhesive composition, the adhesive strength of the adhesive layer (or coating layer) formed by the adhesive composition is decreased and the curing degree of the adhesive layer (or coating layer) is increased, so that the workability at the time of producing the rubber composite may be reduced. On the other hand, when the content of the rubber latex exceeds 22% by weight, an excessive amount of the rubber latex is not cured and thus the adhesive strength of the adhesive layer (or coating layer) is lowered, and the adhesive layer (or coating layer) formed by the adhesive composition becomes very sticky, which may cause a problem in the manufacturing process of the rubber composite.

As the rubber latex, at least one of a vinylpyridine-styrene-butadiene copolymer latex (VP latex), a modified latex in which vinylpyridine-styrene-butadiene copolymer is modified with a carboxyl group, a styrene-butadiene latex, and modified latex thereof, a natural rubber latex, an acrylic acid ester copolymer latex, and a butyl rubber latex may be used. In addition, latex prepared by dispersing the same rubber components as the rubber components formulated in the covering rubber in water or an organic solvent may be used.

According to one embodiment of the present invention, a vinylpyridine-styrene-butadiene copolymer latex (VP latex) may be used as the rubber latex. More specifically, LM-60 from Denaka, VP-150 from APCOTEX, and VB-1099 from Nippon A & L, which are commercially available terpolymer latexes (Vinyl-Pyridine-Styrene-Butadiene-Terpolymer Latex), may be used as the rubber latex. 5218 from Closlen or 0653 from Closlen may also be used as the rubber latex.

On the other hand, in the adhesive composition according to one embodiment of the present invention, a mixture (A+B) of the epoxy compound (A) and the isocyanate compound (B), and the rubber latex (C), have a weight ratio [(A+B):C] of 1:3 to 1:18. At this time, the epoxy compound and the isocyanate compound may be used at a weight ratio of 1:1 to 1:8.

When a weight ratio [C/(A+B)] of the rubber latex (C) to the mixture (A+B) of the epoxy compound (A) and the isocyanate compound (B) is less than 3/1, excessive cross-linking occurs, the stiffness of the adhesive layer (or coating layer) formed by the adhesive composition is increased, the workability is reduced in the manufacturing process of the rubber composite such as a tire, and the fatigue resistance of the rubber reinforcing material may be decreased. Meanwhile, when a weight ratio [C/(A+B)] of the rubber latex (C) to the mixture (A+B) of the epoxy compound (A) and the isocyanate compound (B) exceeds 18/1, an excessive amount of the rubber latex is not cured and thus the adhesive strength of the adhesive layer (or coating layer) is lowered, the adhesive layer (or coating layer) formed by the adhesive composition becomes very sticky, which may cause a problem in the manufacturing process of the rubber composite such as a tire, and the durability of the rubber composite may be reduced.

More specifically, the mixture (A+B) of the epoxy compound (A) and the isocyanate compound (B) and the rubber latex (C) may have a weight ratio [(A+B):C] of 1:3 to 1:14. Even when the weight ratio [C/(A+B)] of the rubber latex (C) to the mixture (A+B) of the epoxy compound (A) and the isocyanate compound (B) exceeds 14/1, an excessive amount of the rubber latex is not cured, and thus problems can occur where the adhesive layer (or coating layer) formed by the adhesive composition may become very sticky.

The adhesive composition according to an embodiment of the present invention includes 1.0 to 8.0% by weight of a polyurethane dispersion (PUD) resin based on the total weight. The polyurethane dispersion resin is also called an aqueous polyurethane resin dispersion. The polyurethane dispersion (PUD) resin includes water ($H_2O$) and polyurethane dispersed in water. The polyurethane dispersion resin (PUD) may include, for example, 30 to 60% by weight of polyurethane and 40 to 70% by weight of water, and may further contain minor amounts of additives.

Polyurethane is a polymer compound having a urethane bond in a molecule, and is generally formed by a reaction between a diisocyanate compound and a polyol. Such polyurethane has excellent abrasion resistance, oil resistance, solvent resistance, and elasticity, and thus is applied to an adhesive, an impregnant, and the like.

Conventionally, polyurethane was produced or distributed mainly in a state of being dissolved in an organic solvent. However, organic solvents are harmful to the human body or the environment and there is a risk of ignition. Thus, in one embodiment of the present invention, the polyurethane dispersion resin which is an aqueous polyurethane rather than an organic solvent-based polyurethane is used.

The polyurethane dispersion resin protects or captures the amine as a curing agent, thereby allowing the adhesive layer (or coating layer) formed by the adhesive composition to be stably cured. In addition, the polyurethane contained in the polyurethane dispersion resin has excellent affinity with the rubber and has excellent affinity with the fiber components used in the manufacture of the rubber reinforcing material, for example, polyester. Therefore, the adhesive composition including the polyurethane dispersion resin and the adhesive layer (or coating layer) produced therefrom can strongly and stably adhere the rubber and the rubber reinforcing material.

Therefore, the heat-resistant adhesive strength of the adhesive layer (or coating layer) is improved by such polyurethane dispersion resin.

When the content of the polyurethane dispersion resin is less than 1.0% by weight based on the total weight of the adhesive composition, the effect of improving the adhesive strength by the polyurethane dispersion resin may not be exhibited or may be insignificant. On the other hand, when the content of the polyurethane dispersion resin exceeds 8.0% by weight, an excessive amount of the polyurethane dispersion resin is not cured, so that the adhesive layer (or coating layer) formed by the adhesive composition becomes very sticky and the adhesive strength of the adhesive layer (or coating layer) is lowered, and thus the durability of the rubber composite may be lowered.

According to an embodiment of the present invention, the type of the polyurethane dispersion resin is not particularly limited, and the polyurethane dispersion resin produced by various methods can be used. The polyurethane dispersion resin may include, for example, any one of a polycarbonate-based urethane, a polyester-based urethane, a polyacrylic urethane, a polytetramethylene-based urethane, a polycaprolactone-based urethane, a polypropylene-based, and a urethane polyethylene-based urethane.

For example, the polyurethane dispersion resin can be prepared by the reaction of a polyol mainly composed of a polycarbonate polyol, an aliphatic polyisocyanate, and a diol having a hydrophilic property.

Alternatively, an isocyanate-terminated prepolymer formed by the reaction of a polyisocyanate, a polycaprolactone polyol, and an active hydrogen group-containing compound having an anionic group may be reacted with a polyamine in water to prepare a polyurethane dispersion resin.

Alternatively, a polyester polyol and a glycol having an intramolecular carboxyl group are reacted with a diisocyanate, and the prepared polyurethane prepolymer having an isocyanate group can be neutralized with an amine to prepare a polyurethane dispersion resin.

Alternatively, the polyurethane dispersion resin may be produced by the reaction of a polyol selected from polytetramethylene glycol (PTMG), polycaprolactone (PCL), polypropylene glycol (PPG), polyethylene glycol (PEG), and polycarbonatediol (PCDL), a diol having a weight average molecular weight of 80 to 100, an organic diisocyanate, 2,2-bis(hydroxymethyl)propionic acid (DMPA) as an emulsifying agent, and a bio polyol.

More specifically, Impranil DL 1537 from Bayer Material Science, ROBOND from Dow Chemical, and the like can be used as the polyurethane dispersion resin according to one embodiment of the present invention.

The adhesive composition according to an embodiment of the present invention includes 0.1 to 2.0% by weight of an amine compound based on the total weight.

The amine compound acts as a curing agent. Curing of the adhesive composition may be performed or promoted by the amine compound, and thus a stable adhesive layer (or coating layer) may be formed by the adhesive composition.

When the content of the amine compound is less than 0.1% by weight based on the total weight of the adhesive composition, the curing of the adhesive composition may not be smooth. When the content of the amine compound exceeds 2.0% by weight, the adhesive strength of the adhesive layer (or coating layer) formed by the adhesive composition may be reduced due to excessive curing.

The type of the amine compound is not particularly limited, and it can be used as an amine compound according to one embodiment of the present invention without limitation as long as it is an amine compound usable as a curing agent. As the amine compound, for example, at least one of an aliphatic amine, an alicyclic amine, and an aromatic amine can be used.

More specifically, Piperazine from DAEJUNG, G640 from Kukdo Chemical, HK511 from Huntzman, and the like can be used as the amine compound according to one embodiment of the present invention.

The adhesive composition according to an embodiment of the present invention includes 69 to 92% by weight of the solvent based on the total weight. Other components (hereinafter also referred to as "solid content") are mixed and stirred with a solvent to form an adhesive composition.

Therefore, the adhesive composition according to one embodiment of the present invention contains 8 to 31% by weight of a solid content (components other than the solvent) based on the total weight.

According to one embodiment of the present invention, the solvent contains water ($H_2O$), and in particular, demineralized water can be used as the solvent. The adhesive composition according to one embodiment of the present invention is an aqueous composition containing a solid content dispersed in water.

According to one embodiment of the present invention, water rather than an organic solvent is used as the solvent. Therefore, the adhesive composition according to one embodiment of the present invention does not induce human body irritation or environmental contamination due to organic solvents.

When the content of the solvent is less than 69% by weight based on the total weight of the adhesive composition, the mixing and dispersibility of the solid components are lowered and the workability is lowered. On the other hand, when the content of the solvent exceeds 92% by weight, it is difficult to form the adhesive layer (or coating layer) due to the excessive solvent, and the strength and adhesive strength of the adhesive layer (or coating layer) may be lowered, and it may take a long time to dry.

More specifically, the water used as the solvent may be included in the content of 69 to 80% by weight based on the total weight of the adhesive composition. When the content of water is 69 to 80% by weight, mixing and dispersion of the solid component other than the solvent can be easily performed.

Hereinafter, a method of manufacturing a rubber reinforcing material according to another embodiment of the present invention will be described.

The method of manufacturing a rubber reinforcing material according to another embodiment of the present invention includes: a first coating step in which a base substrate is dipped in a first coating liquid and dried to form a first coating layer on the base substrate; and a second coating step in which the first coated base substrate is dipped in a second coating liquid and dried to form a second coating layer on the first coating layer.

According to another embodiment of the present invention, the base substrate may be, for example, a raw cord for tire cord, a fiber, and a fiber. By forming the first and second coating layers on the base substrate, a rubber reinforcing material such as a tire cord, a rubber reinforcing film, and a rubber reinforcing fiber is produced.

Here, the coating layer formed by the first coating using the first coating liquid is referred to as a first coating layer, and the coating layer formed by the second coating using the second coating liquid is referred to as a second coating layer. The second coating layer is formed on the first coating layer. The first coating layer and the second coating layer are collectively referred to as a coating layer.

The first coating liquid includes an epoxy compound and an isocyanate compound. The first coating layer formed by this first coating liquid imparts an adhesion-active group to the base substrate for the rubber reinforcing material. As the second coating liquid, the adhesive composition according to an embodiment of the present invention described above can be used.

According to another embodiment of the present invention, the base substrate for the manufacture of a rubber reinforcing material may include a polyester. In addition, the polyester includes polyethylene terephthalate (PET). Since these polyesters have a small number of reaction-active groups and thus lack reaction activity, the adhesive composition according to an embodiment of the present invention is not easily attached to the polyester. Thus, the first coating is performed to impart a reactive group to the polyester, thereby forming the first coating layer.

The substance capable of imparting such a reactive group may be an epoxy, a multi-functional isocyanate, and Pexul (ICI).

According to another embodiment of the present invention, a first coating liquid including an epoxy compound and an isocyanate compound is used to impart reactive groups to the polyester.

Such first coating liquid can penetrate to the monofilament of the polyester which is the base substrate to impart a reactive group to the base substrate.

If the amount of the isocyanate compound is smaller than that of the epoxy compound, sufficient crosslinking is not achieved, and in many cases, the curing degree of the first coating layer is increased more than necessary. Thus, according to another embodiment of the present invention, the epoxy compound and the isocyanate compound in the first coating liquid have a weight ratio of 2:1 to 1:2.

The epoxy compound and the isocyanate compound are dispersed in a solvent. That is, the first coating liquid includes an epoxy compound, an isocyanate compound, and a solvent. According to another embodiment of the present invention, water may be used as the solvent.

When the content of the solvent is insufficient, the first coating due to dipping is not smoothly performed, and when the content of the solvent is too high, the reactive group is not sufficiently imparted to the base substrate. Considering these points, the solvent has a content of 94 to 99% by weight based on the total weight of the first coating liquid, and the mixture of the epoxy compound and the isocyanate compound has a content of 1 to 6% by weight. Specifically, the first coating liquid contains 1 to 6% by weight of a mixture of an epoxy compound and an isocyanate compound and 94 to 99% by weight of a solvent based on the total weight.

The base substrate is dipped in the first coating liquid and then dried. The first coating liquid is applied onto the base substrate by such dipping. The first coating liquid is then dried and cured.

More specifically, the base substrate treated with the first coating liquid is dried at a temperature of 100 to 160° C. for 30 to 150 seconds. Thereby, the first coating layer is formed on the base substrate. During this drying, a tension of 0.05 to 3.00 g/d can be applied to the base substrate. More specifically, a tension of 0.2 to 1.00 g/d can be applied to the base substrate during drying.

Next, the first coating layer is cured at a temperature of 200 to 260° C. for 30 to 150 seconds.

By this heat treatment, the first coating layer is stably formed on the base substrate.

The method of forming the first coating layer according to another embodiment of the present invention is not limited to the dipping method. The first coating liquid may be applied or sprayed onto the base substrate, and then dried and cured to form the first coating layer.

Next, a second coating layer is formed on the first coating layer. This is called secondary coating.

The second coating layer is made by the second coating liquid. An adhesive composition according to an embodiment of the present invention may be used as the second coating liquid.

Specifically, the second coating liquid may include 0.5 to 4.0% by weight of an epoxy compound, 1.0 to 8.0% by weight of an isocyanate compound, 1.0 to 8.0% by weight of a polyurethane dispersion resin (PUD), 1.7 to 22% by weight of a rubber latex, 0.1 to 2.0% by weight of an amine compound, and 69 to 92% by weight of a solvent. In the second coating liquid, the epoxy compound and the isocyanate compound are mixed at a weight ratio of 1:1 to 1:10. More specifically, in the second coating liquid, the epoxy compound and the isocyanate compound may have a weight ratio of 1:1 to 1:8, or a weight ratio of 1:1 to 1:4. The mixture (A+B) of the epoxy compound (A) and the isocyanate compound (B), and the rubber latex (C), have a weight ratio [(A+B):C] of 1:3 to 1:18. More specifically, the mixture (A+B) of the epoxy compound (A) and the isocyanate compound (B) and the rubber latex (C) may have a weight ratio [(A+B):C] of 1:3 to 1:14.

The adhesive composition used as the second coating liquid has already been described, and thus a repeated description on the second coating liquid will not be provided here.

The step of forming the second coating layer is a step of forming a second coating layer having an excellent adhesive property to a rubber on the base substrate to which the reactive group is imparted, and may be performed in the same or similar manner as the formation of the first coating layer.

Specifically, the first coated base substrate is dipped in the second coating liquid and then dried. The second coating liquid is disposed on the first coating layer by dipping. However, other embodiments of the present invention are not limited thereto, and the second coating liquid may be directly applied or sprayed onto the first coating layer so that the second coating liquid may be disposed on the first coating layer.

In the second coating step, drying is carried out at a temperature of 100 to 160° C. for 30 to 150 seconds. During this drying, a tension of 0.05 to 3.00 g/d can be applied to the base substrate. More specifically, a tension of 0.2 to 1.00 g/d can be applied to the base substrate during drying. Thereby, a second coating layer is formed on the first coating layer.

Then, the second coating layer is cured at a temperature of 200 to 260° C. for 30 to 150 seconds. By this heat treatment, a second coating layer is stably formed on the first coating layer. As a result, a rubber reinforcing material having a coating layer is produced. Here, the coating layer includes a first coating layer and a second coating layer.

However, another embodiment of the present invention is not limited thereto, and the drying temperature, the drying conditions, the drying time, the curing temperature, the curing conditions, and the curing time may be varied as needed.

Figure 1:
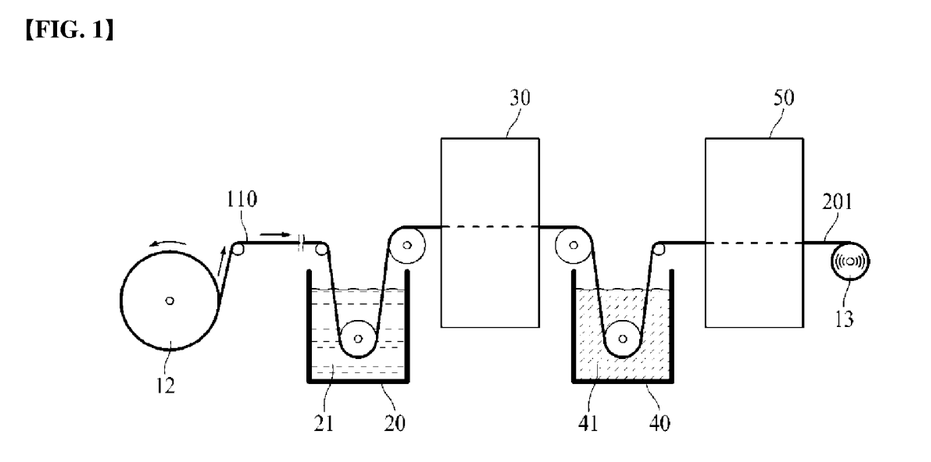
FIG. 1 is a schematic view of a manufacturing process of a tire cord.
Figure 2:
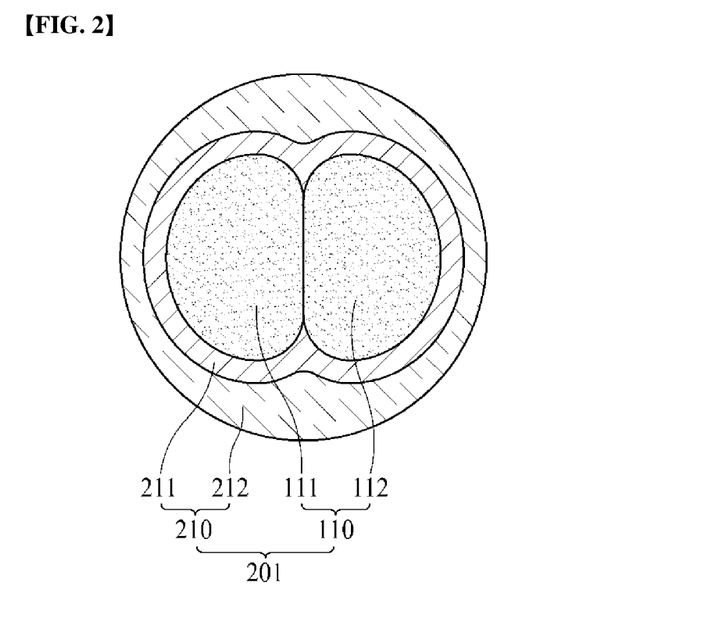
FIG. 2 is a schematic cross-sectional view of a tire cord manufactured according to the manufacturing process of FIG. 1.

Hereinafter, a method of manufacturing a tire cord 201, which is a representative rubber reinforcing material, will be described with reference to FIGS. 1 and 2. FIG. 1 is a schematic view of a manufacturing process of the tire cord 201, and FIG. 2 is a schematic cross-sectional view of the tire cord 201 manufactured according to the manufacturing process of FIG. 1.

The tire cord 201 may be a representative rubber reinforcing material. Also, "raw cord" 110 is used as a base substrate for the manufacture of tire cord 201. Specifically, the tire cord 201 shown in FIG. 1 and FIG. 2 is a rubber reinforcing material, and the raw cord 110 is a base material.

A polyester may be used as the raw cord 110. For example, a ply yarn in which two primary twisted yarns 111 and 112 having a twist number of 300 to 450 TPM manufactured using a polyester filament are secondarily twisted to have a twist number of 300 to 460 TPM, may be used as a raw cord 110. The raw cord 110 can be manufactured and distributed in a state of being wound on a winder 12.

The raw cord 110 is dipped in a first coating liquid 21, dried, and primarily coated to form a first coating layer 211 on the raw cord 110.

The first coating liquid 21 is contained in a first coating bath 20. The raw cord 110 is passed through the first coating liquid 21 contained in the first coating bath 20 to perform a dipping process.

The dipping process may be performed in a dipping machine in which tension, dipping time, and temperature can be adjusted. Such dipping apparatus includes the first coating bath 20 containing the first coating liquid 21.

The first coating liquid 21 may be applied onto the raw cord 110 by coating using a blade or a coater, or by jetting using a jet device as well as a dipping process.

The first coating liquid 21 includes an epoxy compound and an isocyanate compound.

In the first coating liquid, the content ratio of the epoxy compound and the isocyanate compound is adjusted to a weight ratio of 2:1 to 1:2. Further, the first coating liquid includes 1 to 6% by weight of a mixture of an epoxy compound and an isocyanate compound, and 94 to 99% by weight of a solvent. Demineralized water is used as a solvent.

The first coating liquid 21 penetrates into the monofilaments constituting the primary twisted yarns 111 and 112 of the raw cord 110 to impart a reactive group to the raw cord 110.

Next, the first coating liquid 21 applied to the raw cord 110 is dried and cured.

The drying may be performed in the drying apparatus 30. For drying, the raw cord 110 treated with the first coating liquid 21 is heat-treated at a temperature of 100 to 160° C. for 30 to 150 seconds. Thereby, the first coating layer 211 is formed on the raw cord 110. At this time, a tension in the range of 0.05 to 3.00 g/d may be applied to the raw cord 110.

Next, the first coating layer 211 can be treated and cured at a temperature of 200 to 260° C. for 30 to 150 seconds. Curing can also be performed in a drying apparatus 30.

Next, a second coating layer 212 is formed on the first coating layer 211.

The step of forming a second coating layer is a step of applying a rubber-based adhesive composition to the raw cord 110 to which an active group is imparted, in which a second coating liquid having a composition that is different from that of the first coating liquid is used, and a dipping process can be applied similarly to the first coating.

For the formation of the second coating layer 212, the raw cord 110 coated with the first coating layer 211 is dipped in a second coating liquid 41. The second coating liquid 41 is contained in a second coating bath 40. As the second coating liquid 41, an adhesive composition according to an embodiment of the present invention is used.

The second coating liquid 41 is applied onto the first coating layer 211 by such dipping.

Next, the second coating liquid 41 applied on the first coating layer 211 is dried and cured.

The drying may be performed in a drying apparatus 50. For drying, heat treatment is performed at a temperature of 100 to 160° C. for 30 to 150 seconds. Thereby, the second coating layer 212 is formed on the first coating layer 211. At this time, a tension in the range of 0.05 to 3.00 g/d may be applied to the raw cord 110. However, another embodiment of the present invention is not limited thereto, and tension may not be applied to the raw cord 110 in the drying step.

Next, the second coating layer 212 is heat treated and cured at a temperature of 200 to 260° C. for 30 to 150 seconds. The curing may be performed in the drying apparatus 50. The tire cord 201 thus manufactured is wound on a winder 13.

Meanwhile, in the first coating and the second coating, the range of process conditions such as temperature, time, and tension is the same or similar, but in consideration of the characteristics and physical properties of the coating liquid, the process conditions of the second coating may differ from the process conditions of the first coating.

Referring to FIG. 1, since the tire cord 201 is made by a dipping process, this tire cord 201 is also referred to as a dipped cord.

According to this method, various rubber reinforcing materials which are more environmentally friendly than the conventional manufacturing methods and have excellent initial adhesion and internal adhesion can be produced. In addition, the manufacturing method according to one embodiment of the present invention can be applied to the manufacture of other rubber reinforcing materials using a fiber and a film in addition to a tire cord.

Another embodiment of the present invention provides a rubber reinforcing material including a base substrate 110, a first coating layer 211 disposed on the base substrate 110, and a second coating layer 212 disposed on the first coating layer 211, wherein the first coating layer 211 contains an epoxy compound and an isocyanate compound, and the second coating layer includes an epoxy compound, an isocyanate compound, a rubber latex, a polyurethane, and an amine compound. Here, the base substrate 110 is, for example, a raw cord. Further, the rubber reinforcing material is a tire cord 201. Here, the first coating layer 211 and the second coating layer 212 may have visible boundaries. Further, the polyurethane is derived from a polyurethane dispersion (PUD) resin.

According to another embodiment of the present invention, the rubber reinforcing material has an initial adhesive strength of 18.8 kgf or more to the rubber. Here, the initial adhesive strength is an adhesive strength between the rubber reinforcing material and the rubber before heat treatment, and is measured by a cord pull test (H-Test) method according to ASTM D4776. When a rubber reinforcing material having an initial adhesive strength of 18.8 kgf or more to the rubber is used as the tire cord, the rubber component and the tire cord constituting the tire can have excellent adhesive strength. Thereby, the tire can have excellent safety and stability.

The rubber reinforcing material has a heat-resistant adhesive strength of 1.2 kgf or more to the rubber. Here, the heat-resistant adhesive strength is a peel strength when a test piece is peeled at a speed of 125 mm/min using a universal material tester after treating the rubber reinforcing material with a rubber and then heat-treating the prepared test piece at 160° C. for 90 minutes. When a rubber reinforcing material having a heat-resistant adhesive strength of 1.2 kgf or more to a rubber is used as a tire cord, the rubber component and the tire cord constituting the tire can have an excellent adhesive force even when the tire is used at a high temperature for a long time. Accordingly, the tire can have excellent safety and stability.

The rubber reinforcing material has a rubber adhesion ratio of 80% or more. Therefore, the adhesion stability between the tire cord and the rubber is improved, and thus the tire can have excellent safety and stability.

Hereinafter, the functions and effects of the invention will be described in more detail by way of specific examples of the invention. However, these examples are intended for purposes of illustration only and are not intended to limit the scope of the invention.

22 to 25% by weight, and the content of demineralized water which is a solvent is 75 to 78% by weight.

Specifically, according to the content ratio shown in Table 1 below, a sorbitol type of epoxy compound (EX614B from NAGASE) was mixed with demineralized water and stirred for about 1 hour, and then an isocyanate compound (IL-6 from EMS) was additionally mixed. Next, a polyurethane dispersion resin (Impranil 1537 from Bayer) was mixed to improve the adhesive strength of the second coating liquid by the active groups and hydrogen bonds possessed by the polyurethane dispersion resin. In addition, a rubber latex (0653 from Closlen) and an amine compound (Piperazine from DAEJUNG) were mixed and stirred at a temperature of about 20° C. for 24 hours to produce a second coating liquid. The second coating liquid is also referred to as an adhesive composition.

On the other hand, when the amine compound reacts with the rubber for a long period of time, the adhesive force of the second coating liquid may be lowered by an aminolysis reaction. Therefore, the content of the amine compound in Example 1-3 was set to 0.2 to 0.4 wt %. By applying the isocyanate compound and the amine compound together, a field process property was ensured and workability was improved.

In addition, the coating liquids according to Comparative Examples 1 and 2 were prepared by using RFL, including conventionally used resorcinol (Sigma) and formaldehyde (Sigma). Further, coating solutions according to Comparative Examples 3 to 6 were prepared by selectively using an epoxy compound, an isocyanate compound, a rubber latex, a polyurethane dispersion resin, and an amine compound according to the content ratios shown in Table 1 below.

TABLE 1

| Component (wt %) | Ex. 1 | Ex. 2 | Ex. 3 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|
| Epoxy compound | 1.0 | 1.3 | 1.3 | — | — | 1.0 | 1.3 | 1.3 | 1.3 |
| Isocyanate compound | 4.0 | 4.0 | 4.1 | — | — | 2.7 | 2.7 | 4.0 | 4.0 |
| Rubber latex | 15.3 | 16.0 | 16.2 | 21.5 | 17.2 | 16.0 | 16.0 | 16.0 | 16.0 |
| Polyurethane dispersion | 1.5 | 2.0 | 3.0 | — | — | — | — | 1.0 | — |
| Amine compound | 0.2 | 0.4 | 0.4 | — | — | — | — | — | 0.8 |
| Resorcinol | — | — | — | 2.6 | 2.08 | 2.6 | 2.08 | 2.6 | 2.08 |
| Formaldehyde | — | — | — | 0.6 | 0.48 | 0.6 | 0.48 | 0.6 | 0.48 |
| Demineralized water ($H_2O$) | To 100 | To 100 | To 100 | To 100 | To 100 | To 100 | To 100 | To 100 | To 100 |

Examples 1-3 and Comparative Examples 1-6

1. Preparation of RF-Free Coating Liquid
(1) Preparation of First Coating Liquid (First Dip)

An epoxy compound and an isocyanate compound were mixed in a weight ratio of 1:2 to prepare a first coating liquid.

Specifically, 1.0 wt % of a sorbitol type epoxy compound (EX614B from NAGASE) was mixed with 97 wt % of demineralized water as a solvent, and the mixture was stirred for about 1 hour, and then 2.0% by weight of an isocyanate compound (IL-6 from EMS) was additionally mixed to prepare a first coating liquid.

(2) Preparation of Second Coating Liquid (Second Dip)

An epoxy compound, an isocyanate compound, a rubber latex, a polyurethane dispersion resin, an amine compound, and a solvent were mixed according to the contents shown in Table 1 below to prepare second coating liquids according to Examples 1 to 3, respectively. Here, the solid content is 2. Manufacture of Tire Cord Two primary twisted yarn strands (Z-direction) 111 and 112 having a twist number of 360 TPM were prepared using a polyester raw yarn (filament), and then the two primary twisted yarn strands were secondarily twisted (in S-direction) together to have a twist number of 360 TPM, thereby producing a ply yarn (1650 dtex/2 ply). The ply yarn thus produced was used as a raw cord 110.

A raw cord 110 composed of a polyester was dipped in a first coating liquid, and then dried at a drying temperature of 150° C. for about 1 minute and cured at a curing temperature of 243° C. for about 1 minute to form a first coating layer 211, thereby imparting a reaction-active group to the raw cord 110.

Then, in order to apply an adhesive composition to the raw cord 110 on which the first coating layer 211 was formed, the raw cord 110 on which the first coating layer 211 was formed was dipped in the second coating liquid, dried, and cured. At this time, drying was performed at a drying temperature of 150° C. for about 1 minute and curing was performed at a curing temperature of 243° C. for about 1 minute. The first coating dipping step and the second coating liquid dipping step were performed continuously, wherein the tension condition was 0.5 g/d. Thereby, the tire cord 201 according to Examples 1-3 and Comparative Examples 1-6 was manufactured in the form of a dipped cord.

3. Evaluation of adhesive strength
(1) Evaluation of Initial Adhesive Strength

In order to evaluate the adhesion performance of the coating layer 210 in the tire cords manufactured in Examples 1-3 and Comparative Examples 1-6, a cord pull test (H-Test) was conducted according to ASTM D4776, and the results are shown in Table 2 below. Here, the coating layer 210 includes a first coating layer 211 and a second coating layer 212 formed by the first and second coating liquids, respectively.

The test piece for evaluation of initial adhesive strength is a rubber block (initial adhesion test piece) prepared by placing the tire cord produced in Example 1-3 and Comparative Example 1-6 in a rubber block and vulcanizing them at 170° C. for 15 minutes. The rubber block used for the evaluation of the initial adhesive strength was made of a rubber for a carcass.

Next, the tire cord of the test piece was pulled from the rubber block at a speed of 250 mm/min by using a universal material tester (Instron), wherein the initial force was expressed in units of kgf/cm. The force required at this time is described in units of kgf/cm to show the initial adhesive strength.

(2) Evaluation of Heat-Resistant Adhesive Strength

In order to evaluate the heat resistant adhesive strength of the coating layer 210 in the tire cords produced in Example 1-3 and Comparative Example 1-6, the tire cords produced in Examples 1 to 3 and Comparative Examples 1 to 6 were placed in a rubber block, heated, and pressed at 160° C. for 90 minutes to prepare a test piece. A peel strength at the time of peeling a test piece at a speed of 125 mm/min was measured using a universal material tester (Instron). The value obtained by dividing the result by the number of cords used was described as "adhesive strength per cord". The rubber block used for the evaluation of heat-resistant adhesive strength was made of a rubber for a carcass.

(3) Evaluation of Rubber Adhesion Ratio (Coverage)

The rubber adhesion ratio is a scale for indicating an adhesion property of a rubber to a fiber.

The rubber adhesion ratio is obtained by visually judging the degree of rubber adhesion of a portion peeled off from the rubber in the sample whose adhesion evaluation has been completed. The rubber adhesion ratio was evaluated as four grades of A, B, C, and D (grade A: rubber adhesion amount 100 to 80%, grade B: 80 to 60%, grade C: 60 to 40%, grade D: 40% or less). The grade was independently determined by three examiners and then averaged.

The measured results are shown in Table 2 below.

Referring to Table 2, comparing the initial adhesive strengths of the tire cords according to Comparative Example 1 and Example 1, it can be confirmed that when the adhesive composition according to one embodiment of the present invention (Example 1) was applied, it had an initial adhesive strength of about 106.8% as compared with the case where a conventional adhesive composition was applied (Comparative Example 1).

In addition, in terms of the heat-resistant adhesive strength, when the adhesive composition according to one embodiment of the present invention was applied (Example 1), it had a heat-resistant adhesive strength of about 136% as compared with the case where a conventional adhesive composition was applied (Comparative Example 1).

On the other hand, in the case of Comparative Example 3 in which an epoxy compound, an isocyanate compound, and a rubber latex were used without using resorcinol and formaldehyde, satisfactory initial adhesive strength and heat-resistant adhesive strength were not exhibited. The reason is that the coating liquid of Comparative Example 3 has a limitation in that polymerization at room temperature is difficult. This is presumably because the ring opening temperature of the epoxy is 130° C. and the de-blocking temperature of the blocked isocyanate is 180° C. In the coating layer of Comparative Example 3, resin formation of a three-dimensional structure is insufficient, and the initial adhesion performance is poor.

In the case of Comparative Example 3, the rubber latex was not integrally formed with the tire cord, and the rubber latex smears to the rubber block in the gel state during the peeling test of the tire cord. A phenomenon occurs in which rubber adheres to the rubber block in a gel state during the peeling test of the tire cord. Problems may occur during tire manufacturing process. For reference, in the tire cords according to Comparative Examples 1 and 2 using resorcinol and formaldehyde, a phenomenon does not occur in which rubber smears to the rubber block. In the case of Comparative Example 3, the rubber adhesion ratio is not excellent (grade C).

In the case of Comparative Example 4 in which a resin having a three-dimensional structure was formed in the coating layer by increasing the content of the epoxy compound to form polyisocyanate, the initial adhesive strength was improved as compared with Comparative Example 3, but gel development caused by rubber latex was still not improved. Further, in the case of Comparative Example 4, the rubber adhesion ratio was not excellent (grade C).

In the case of Comparative Example 5 using an epoxy compound, an isocyanate compound, a rubber latex, and a polyurethane dispersion, allophanate bonds were formed due to the reaction between the "N=C=O" group of the isocyanate and the urethane group, and thus the initial adhesive strength was improved as compared with Comparative Example 4, but the heat-resistant adhesive strength was not improved significantly. In addition, the tire cord of

TABLE 2

|  | Ex. 1 | Ex. 2 | Ex. 3 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|
| Initial adhesive strength (kgf) | 18.8 | 19.8 | 19.2 | 18.2 | 16.8 | 12.5 | 15.8 | 17.5 | 18.5 |
| Heat resistant adhesive strength (kgf) | 1.4 | 1.5 | 1.2 | 1.1 | 1.0 | 0.6 | 0.7 | 1.0 | 1.1 |
| Rubber adhesion ratio | A | A | A | A | B | C | C | B | B |

Comparative Example 5 had a superior rubber adhesion ratio to that of Comparative Example 3-4, but had a poor rubber adhesive strength (grade B) as compared with Example 1-3. In the case of Comparative Example 6 in which an epoxy compound, an isocyanate compound, a rubber latex, and an amide compound were used in order to carry out room temperature polymerization, the initial adhesive strength and the thermal adhesive strength were improved as compared with Comparative Example 3-4. This is presumably because the epoxy compound in the second coating liquid reacts with the amine compound to form a hydroxyl group, and the room temperature polymerization of the second coating liquid is possible (see Reaction Scheme 1 below).

[Reaction Scheme 1]

When an epoxy compound and an amine compound are used together as shown above, it is possible to perform room temperature polymerization of the coating liquid.

On the other hand, the tire cord of Comparative Example 6 had a superior rubber adhesion ratio to that of Comparative Example 3-4, but had a poor rubber adhesive strength (grade B) as compared with Example 1-3.

Embodiments of the present invention have been made with reference to these results, and one embodiment of the present invention provides a second coating liquid which enables room temperature polymerization, but does not cause gelation or gel smearing of the rubber latex and has excellent initial adhesive strength and thermal adhesive strength. Another embodiment of the present invention provides a tire cord manufactured by using such a second coating liquid as an adhesive composition.

Specifically, according to one embodiment of the present invention, it can be confirmed that an adhesive composition capable of exhibiting similar or improved initial adhesive strength and heat-resistant adhesive strength, which does not include resorcinol and formaldehyde, can be manufactured. As described above, according to the present invention, it is possible to produce a variety of rubber reinforcing materials including an adhesive layer or a coating layer which are more environmentally friendly than conventional RFLs and have good initial adhesive strength and internal adhesive strength.

DESCRIPTION OF SYMBOLS

21: first coating liquid
41: second coating liquid
110: raw cord
111, 112: primary twisted yarn
201: tire cord
210: coating layer
211: first coating layer
212: second adhesive layer (or coating layer)

The invention claimed is:

1. An adhesive composition comprising, on the basis of the total weight thereof:
   1.0 to 1.3% by weight of an epoxy compound;
   4.0 to 4.1% by weight of an isocyanate compound;
   15.3 to 16.2% by weight of a rubber latex;
   1.5 to 3.0% by weight of a polyurethane dispersion (PUD) resin;
   0.2 to 0.4% by weight of an amine compound; and
   69 to 92% by weight of a solvent,
   wherein the epoxy compound and the isocyanate compound have a weight ratio of 1:1 to 1:10,
   wherein the polyurethane dispersion resin includes at least one of a polycarbonate-based urethane, a polyester-based urethane, a polyacrylic urethane, a polytetramethylene-based urethane, a polycaprolactone-based urethane, a polypropylene-based urethane, and a polyethylene-based urethane.

2. The adhesive composition according to claim 1, wherein the mixture of the epoxy compound and the isocyanate compound, and the rubber latex, have a weight ratio of 1:3 to 1:18.

3. The adhesive composition according to claim 1, wherein the epoxy compound and the isocyanate compound have a weight ratio of 1:1 to 1:8.

4. The adhesive composition according to claim 1, wherein the solvent includes water ($H_2O$).

5. The adhesive composition according to claim 4, wherein the water is included in the content of 69 to 80% by weight based on the total weight.

6. The adhesive composition according to claim 1, wherein the epoxy compound includes at least one of a glycidyl ether type of compound, a novolac type of epoxy resin, and a bisphenol type of epoxy resin.

7. The adhesive composition according to claim 1, wherein the isocyanate compound has a phenyl group.

8. The adhesive composition according to claim 1, wherein the rubber latex includes at least one of a vinylpyridine-styrene-butadiene copolymer latex, a modified latex in which vinylpyridine-styrene-butadiene copolymer is modified with a carboxyl group, a styrene-butadiene latex and a modified latex thereof, a natural rubber latex, an acrylic acid ester copolymer-based latex, a butyl rubber latex, and a chloroprene rubber latex.

9. The adhesive composition according to claim 1, wherein the amine compound includes at least one of an aliphatic amine, an alicyclic amine, and an aromatic amine.

10. A method for manufacturing a rubber reinforcing material, comprising:
    a first coating step in which a base substrate is dipped in a first coating liquid and dried to form a first coating layer on the base substrate; and
    a second coating step in which the first coated base substrate is dipped in a second coating liquid and dried to form a second coating layer on the first coating layer,
    wherein the first coating liquid includes an epoxy compound and an isocyanate compound,
    the second coating liquid includes the adhesive composition according to claim 1, and
    in the first coating liquid, the epoxy compound and the isocyanate compound are mixed in a weight ratio of 2:1 to 1:2.

11. The method for manufacturing a rubber reinforcing material according to claim 10, wherein the base substrate includes a polyester.

12. The method for manufacturing a rubber reinforcing material according to claim 10, wherein the base substrate is any one of a raw cord, a film, and a fiber.

13. The method for manufacturing a rubber reinforcing material according to claim 10,
wherein in the first coating step, the drying is performed at a temperature of 100 to 160° C. for 30 to 150 seconds.

14. The method for manufacturing a rubber reinforcing material according to claim 13,
wherein a tension of 0.05 to 3.00 g/d is applied to the base substrate during the drying.

15. The method for manufacturing a rubber reinforcing material according to claim 13, further comprising curing the first coating layer at a temperature of 200 to 260° C. for 30 to 150 seconds after the drying.

16. The method for manufacturing a rubber reinforcing material according to claim 10, wherein in the second coating step, the drying is performed at a temperature of 100 to 160° C. for 30 to 150 seconds.

17. The method for manufacturing a rubber reinforcing material according to claim 16,
wherein a tension of 0.05 to 3.00 g/d is applied to the base substrate during the drying.

18. The method for manufacturing a rubber reinforcing material according to claim 16, further comprising curing the second coating layer at a temperature of 200 to 260° C. for 30 to 150 seconds after the drying.

19. The adhesive composition according to claim 10, wherein the mixture of the epoxy compound and the isocyanate compound have a weight ratio of 1:1 to 1:8.

20. A rubber reinforcing material comprising:
a base substrate;
a first coating layer disposed on the base substrate; and
a second coating layer disposed on the first coating layer,
wherein the first coating layer includes an epoxy compound and an isocyanate compound, and
the second coating layer includes the cured adhesive composition according to claim 1.

21. The rubber reinforcing material according to claim 19, wherein the base substrate is a raw cord.

22. The rubber reinforcing material according to claim 20, having an initial adhesive strength of 18.8 kgf or more to the rubber,
wherein the initial adhesive strength is an adhesive strength between the rubber reinforcing material and the rubber before heat treatment, and is measured by a cord pull test (H-Test) method according to ASTM D4776.

23. The rubber reinforcing material according to claim 20, having a heat-resistant adhesive strength of 1.2 kgf or more to the rubber,
wherein the heat-resistant adhesive strength is a peel strength when a test piece is peeled at a speed of 125 mm/min using a universal material tester after treating the rubber reinforcing material with a rubber and then heat-treating the prepared test piece at 160° C. for 90 minutes.

24. The rubber reinforcing material according to claim 20, having a rubber adhesion ratio of 80% or more.

* * * * *